United States Patent [19]

Sampietro et al.

[11] Patent Number: 5,313,354
[45] Date of Patent: May 17, 1994

[54] DISC DRIVE LATCH HOUSING HAVING IMPROVED VIBRATION DAMPENING

[75] Inventors: Joseph M. Sampietro, Tarzana; Richard G. Krum, Thousand Oaks; Khosrow Mahajerani, Newbury Park, all of Calif.

[73] Assignee: Seagate Technology, Inc., Scotts Valley, Calif.

[21] Appl. No.: 976,247

[22] Filed: Nov. 12, 1992

[51] Int. Cl.[5] .................. G11B 5/54; G11B 21/22; G11B 5/48; G11B 21/16
[52] U.S. Cl. .................. 360/105; 360/104
[58] Field of Search .................. 360/104–106, 360/109

[56] References Cited

U.S. PATENT DOCUMENTS

| | | | |
|---|---|---|---|
| 4,346,416 | 8/1982 | Riggle et al. | 360/106 |
| 5,003,422 | 3/1991 | Sun et al. | 360/105 |
| 5,019,932 | 5/1991 | Iwata | 360/105 |
| 5,134,608 | 7/1992 | Strickler et al. | 360/105 |
| 5,208,713 | 5/1993 | Lindsay et al. | 360/105 |

Primary Examiner—John H. Wolff
Assistant Examiner—David D. Davis
Attorney, Agent, or Firm—Edward P. Heller, III

[57] ABSTRACT

A latch housing for a carriage latch in a disc drive comprising a cantilever beam and a buckling beam. The cantilever beam and the buckling beam are so oriented in relation to each other and the path of the carriage that contact between a latching feature on the moving carriage and the carriage latch occurs with the beams at an original position and causes the cantilever beam to deflect in a cantilever mode and the buckling beam to deflect in a buckling mode until the kinetic energy of the moving carriage is converted to internal stresses in the material of the beams. Reactive motion of the beams due to these internal stresses is limited to a return to the original position by leashing action of the buckling beam. In a preferred embodiment, the latch housing is realized as a one-piece molded component, and the material of the component as well as the dimensions and shapes of the cantilever beam and buckling beam are all selected to limit the motion caused by contact between the moving latch feature and the latch to a single excursion from the original position to a maximum deflected position and back to the original position.

3 Claims, 3 Drawing Sheets

DISC DRIVE LATCH HOUSING HAVING IMPROVED VIBRATION DAMPENING

BACKGROUND OF THE INVENTION

1. Field of the Invention

This invention relates generally to the field of disc drive data storage devices and more particularly, but not by way of limitation, to a latch housing for mounting and supporting a latch mechanism for latching the moving head carriage of the disc drive and dissipating some of the kinetic energy of the moving carriage.

2. Brief Description of the Prior Art

Systems to absorb the kinetic energy of mechanical shocks generated by contact with a moving body are well known in the art. The simplest of such systems include some type of deformable member which deflects from its original position or shape in response to impact from a moving body.

If the system is intended for "one-time" use, the deformable member may be permanently altered. An example of such a system is the "crushable" bodywork of certain current automobiles, which are designed to absorb the destructive force of a collision, while diminishing the force transferred to occupants of the vehicle.

Other common systems include some type of resilient member designed to deform at impact and return to its original condition after the kinetic energy of the contact has been absorbed. An example of, perhaps, the simplest of this type of shock absorption system is a rubber block mounted in the path of a moving object—such as a swinging door—which deforms at impact and "bounces back" to its original shape. Other examples of this type of mechanical shock absorption systems are easily recalled, including those which incorporate springs, cantilevered beams and other resilient members.

Most simple systems which include resilient members, though, operate under the assumption that the resilient member can be allowed to deflect—or deform—in the original direction of movement of the moving body and then "spring" back past the original shape or location of the resilient member, before returning—after perhaps several iterations of this oscillation—to the original, or neutral, position. This is indeed an acceptable response in these systems.

There are, however, cases in which such "bouncing" about a neutral position is unacceptable, i.e., in which the system may be permitted to deflect only in the direction of movement of the moving body, and must then return to the neutral position without passing the original point of contact.

One such situation is found in the carriage latching mechanisms of disc drive data storage devices.

Disc drive data storage devices of the type commonly referred to as "Winchester" disc drives record—or write—and retrieve—or read—digital data on a magnetic medium deposited on the surfaces of rotating rigid disc members. During operation, the air pulled along by the spinning discs interacts with self-acting hydrodynamic air bearing surfaces on read/write heads to "fly" the heads in close proximity to the discs, thus eliminating any contact-induced wear on or damage to the heads or discs. An actuator mechanism is typically employed to controllably move a vertically aligned array of read/write heads—one per disc surface—to any desired one of a plurality of circular, concentric data tracks on the discs. The rapidity of this movement—or seek time—is one of the principal criteria by which the performance of the disc drive is judged. The quest for minimal seek time has lead to one of the greater challenges facing a designer of disc drives. Current high performance disc drives utilize voice coil motors to move the heads from track to track, and have achieved average seek times of less than ten milliseconds (0.010 seconds) with great reliability. Such seek performance requires that the actuator achieve extremely high velocities. For instance, a high-performance disc drive of the current technology using a rotary voice coil actuator typically achieves radial velocities of 220 radians per second. Even though the moving mass of the actuator is minimized by design, speeds of this order create a significant problem for the designer.

Moving-coil voice coil motors incorporate a coil of wire suspended within the field of a permanent magnet—or array of magnets—and constrained by some type of mechanical attachment mechanism which defines and restricts the coil's direction and extent of motion. When DC current is applied to the coil, an interaction occurs between the magnetic field induced about the coil and the magnetic field of the permanent magnets, in accordance with the well known Lorenz relationship. If, however, power is removed from the coil—as is the case when power is interrupted to a disc drive—the coil is free to move in an uncontrolled manner within the range defined by its mechanical attachment mechanism. Such uncontrolled motion of the voice coil motor in a disc drive data storage device is entirely unacceptable, since the loss of power to the actuator implies simultaneous loss of power to the motor spinning the discs, and thus potentially damaging contact between the heads and discs.

Because of this characteristic of voice coil actuators, the common practice in the industry is to move the heads to a preselected position—or park zone—when any loss of power is detected, and latch the actuator in this position until power is restored. Obviously, since the parking sequence occurs in response to a loss of power, the speed of the actuator during the parking sequence must be maximized, which, in turn, implies that a high level of kinetic energy must be dissipated by the latching mechanism. Further, the challenge is to absorb this kinetic energy, and, at the same time, prevent the heads from oscillating back and forth while direct contact between the heads and discs is possible due to the deterioration of the air bearing.

The features of the present invention are particularly suited to the above described application, since it is capable of absorbing and dissipating the kinetic energy of a moving body by deflecting from a neutral position in response to contact with the moving mass, and includes a mechanism for limiting the extent of motion of the system to a return to the neutral position after such contact and deflection.

SUMMARY OF THE INVENTION

The present invention comprises a pair of beams, each fixed relative to each other at their first ends and mutually connected at their second end to a contact mechanism. The pair of beams are so disposed in relationship to each other and to the direction of travel of a moving body that contact between the moving body and the contact mechanism causes the first of the pair of beams to be deformed in a bending, or cantilever, mode while the second of the pair of beams is deformed in a buckling, or bowing, mode. A portion of the kinetic energy of the moving body is dissipated by the deflection of the beams in the original direction of travel of the moving body, and internal stresses in the material of the beams induce reactive motion in the direction opposite to the original direction of travel of the moving body. When the reactive motion of the system has achieved the original position of the contact mechanism, the second beam inhibits motion beyond this position. The materials and dimensions of the beams are selected relative to the velocity and mass of the moving body to dissipate the kinetic energy of the moving body in a single excursion of the pair of beams away from and back to their original positions. In a preferred embodiment of the invention, a latch housing for a disc drive is shown in which the invention is implemented in a single, molded part.

It is an object of the present invention to provide a system for the partial absorption and dissipation of the kinetic energy of a moving body.

It is another object of the present invention to provide a system for the absorption and dissipation of the kinetic energy of a moving body which can be used repeatedly.

It is another object of the invention to provide a repeatedly-usable system for the absorption and dissipation of the kinetic energy of a moving body in which the kinetic energy of the moving body is dissipated by deformation of resilient members of the system from a beginning position in the direction of motion of the moving body, and reactive motion of the members of the system in an opposite direction from the original direction of the moving body, the reactive motion ending when the resilient members reach the beginning position.

It is another object of the present invention to provide a housing for a carriage latch in a disc drive which will absorb the energy of the moving actuator during a latching sequence brought about by a loss of power to the disc drive.

It is another object of the invention to provide a latch housing that is capable of withstanding recurring impacts from the latching sequence over the design life of the disc drive.

It is another object of the invention to provide a latch housing that is inexpensive to manufacture and simple to install in the disc drive.

These and other objects, features and benefits of the present invention will become evident through an examination of the following detailed description of the invention, when read in conjunction with the accompanying drawings.

DETAILED DESCRIPTION OF THE INVENTION

Figure 1:
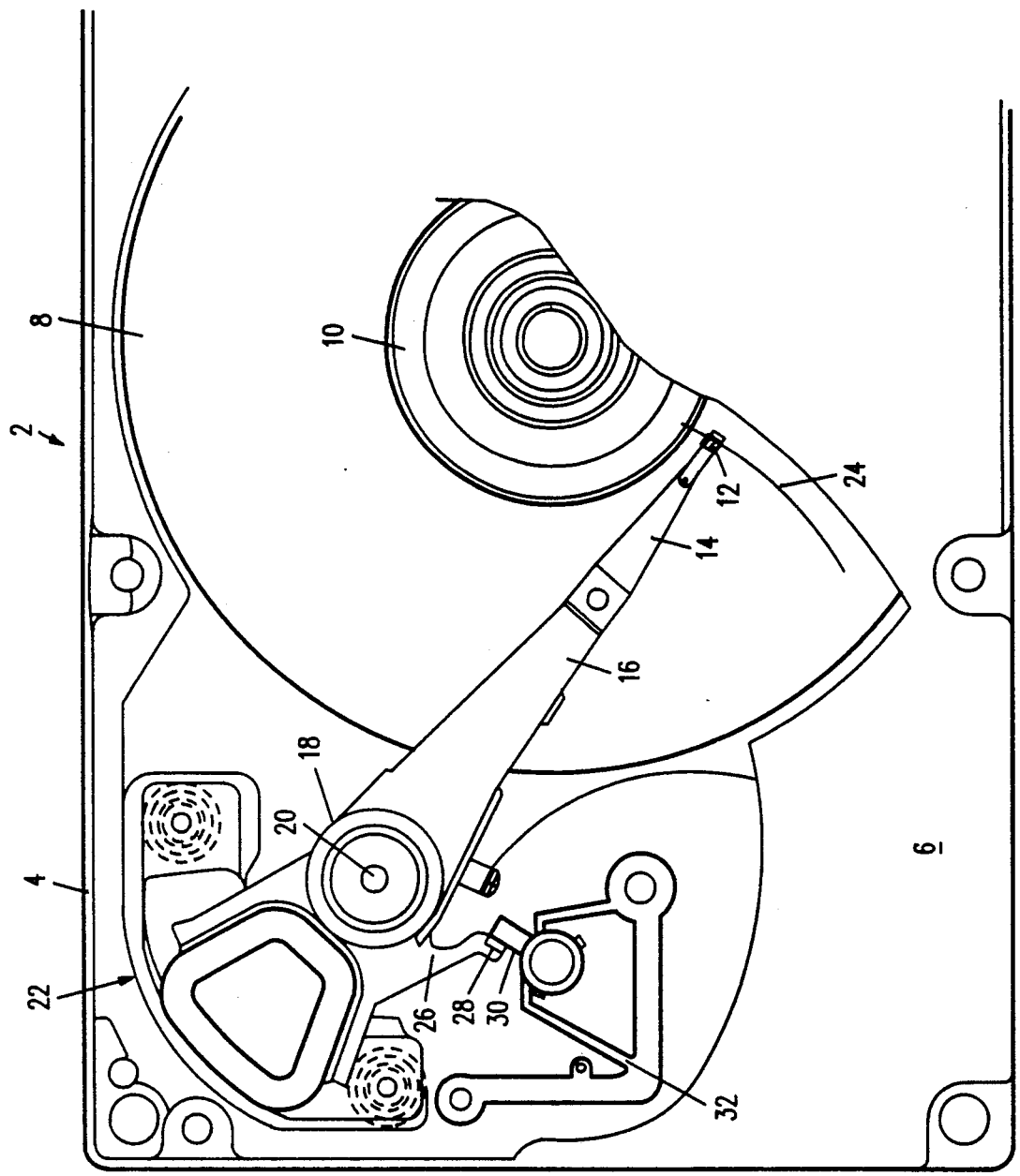
FIG. 1 is a top plan view of a disc drive data storage device in which the present invention is particularly useful.

Turning now to the drawings and more specifically to FIG. 1, shown is a plan view of a disc drive data storage device in which the present invention is particularly useful. Shown is a disc drive 2 which includes a base member 4 to which all other components are either directly or indirectly mounted. A top cover 6 engages with the base member to form a sealed environment to isolate the delicate internal components from outside contaminants. A plurality of discs 8 is mounted for rotation on a spindle motor (not shown) via a disc clamp 10. An array of vertically aligned heads, one of which is shown at 12, is attached through flexures 14 to a plurality of head mounting arms 16, which are part of an actuator body 18. The actuator body 18 is mounted for rotation about a pivot shaft 20, and this rotational movement is powered by a voice coil motor (VCM), shown generally at 22. As the VCM pivots the actuator body 18 about the pivot shaft 20, the heads 12 are controllably moved to any desired one of a plurality of tracks on the surfaces of the discs along arcuate path 24.

The actuator body also includes a carriage latch arm 26 which supports a shorting plate 28. As the heads 12 are moved to their innermost position on the disc 8, this shorting plate 28 contacts a magnetic latch 30 which holds the actuator in this position until the latch is released. The innermost extent of travel of the heads 12 on the disc 8 is thus designated as a park zone, sometimes referred to as a landing zone.

Details of the operation of the magnetic latch 30 may be found in co-pending U.S. patent application Ser. No. 07/975,349, filed coincidentally with this application, assigned to the assignee of the present invention and incorporated herein by reference.

In disc drives of the current technology, it is most common for the heads 12 to be "parked" when a loss of power is detected. This is because the voice coil motor 22 cannot control the position of the heads in the absence of available power to the coil, and any relative motion between the heads 12 and discs 8 while the discs are not spinning can cause damage to the heads 12, discs 8 or both. There are some disc drive products which will also allow this park and latch operation to be performed in response to a received command from a host computer system.

Since the most common reason for parking the heads 12 is to prevent damage due to the loss of power to the disc drive, it is incumbent upon designers of disc drives to ensure that the movement of the heads 12 to the park zone occurs as rapidly as possible. This usually entails applying a maximum amount of correctly polarized DC current to the coil of the VCM, and maintaining this current until the disc drive's ability to supply the current disappears. Typically, no detection means is incorporated in the disc drive to determine when the heads 12 have reached the park zone.

An analysis of FIG. 1 will show that such rapid movement of the heads to the park zone results in a high speed collision between the shorting plate 28 on the actuator body 18 and the magnetic latch 30. Because of the relative delicacy of the components mounting the heads 12, it is highly desirable if this contact between the shorting plate 28 and magnetic latch 30 is not a "hard" contact, i.e., that there is some compliance in the magnetic latch 30 or its mounting structure, hereinafter referred to as a latch housing 32.

While compliance in the latch housing 32 is desirable, it is also desirable that the movement of the heads 12 be brought to a complete halt relative to the discs 8 as quickly as possible. Therefore, any oscillation of the heads back and forth about the park position should be discouraged. The inventive structure of the latch housing 32 is intended to achieve this goal.

Figure 2:
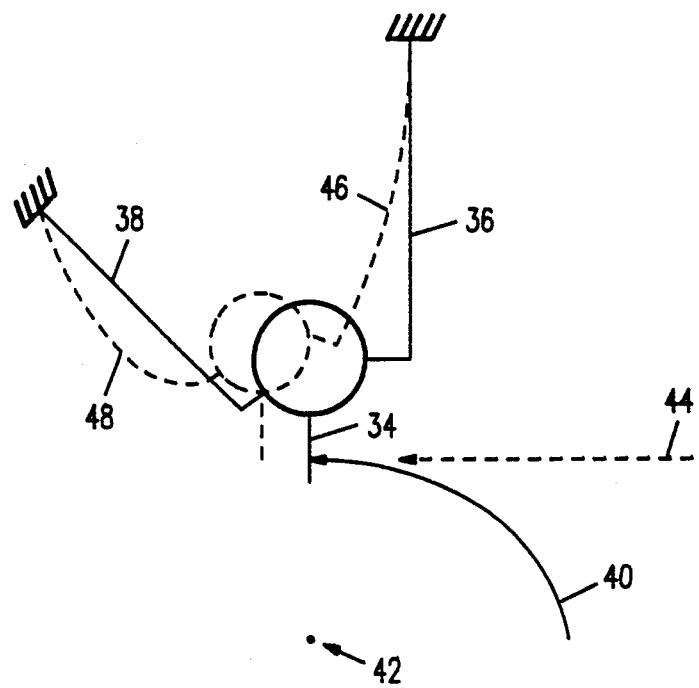
FIG. 2 is a simplified diagrammatic drawing which shows the operational principle of the present invention.

FIG. 2 is a simplified diagrammatic drawing of the principle elements of the invention, and serves to demonstrate the operational principles of the invention. In FIG. 2, a latch/contact mechanism 34 is shown which is analogous to the magnetic latch disclosed in the above-cited co-pending patent application. The latch/contact mechanism 34 is supported by a first beam member 36 and a second beam member 38, and the opposite ends of the beam members 36, 38 are fixed relative to each other at a known distance apart. The path of a moving body (not shown) is indicated by the arc 40, and represents the path which would be followed by a body moving about point 42. The arc 40 can be seen to intersect with the latch/contact mechanism 34. It should be noted that the present invention would work equally effectively in cooperation with a body moving along linear path 44, which becomes tangential to the arc 40 at the point of contact with the latch/contact mechanism 34. The first beam 36 is oriented in relationship to the instantaneous path of the moving object at the point of contact such that it acts as a cantilever beam, while the second beam 38 is oriented to the path of the moving object at an angle which will cause the second beam 38 to buckle, or bow, under the force of impact between the moving body and the latch/contact mechanism 34. The behavior of the beams 36, 38 after impact is shown by the dotted lines 46, 48. The deformation of the beams 36, 38 brought about by the impact of a moving body on the latch/contact mechanism 34 develops internal stresses in the beams 36, 38 which tend to restore the beams 36, 38 to their original shapes. In doing so, the latch/contact mechanism moves back toward its original position, and when this original position is attained, the second beam 38 has straightened to its original length and acts as a "leash" to prevent the latch/contact mechanism 34 from "overshooting" its original position. If it is assumed that the moving body "sticks" to the latch/contact mechanism 34—as would be the case in a magnetic latch for a disc drive—then it is easy to see that such a system is capable of absorbing the kinetic energy of the moving body by the deformation and deflection of the beams 36, 38, and returning the moving body and the latch/contact mechanism 34 to the initial point of contact. If the mass and velocity of the moving body are known, it is possible to select materials and dimensions for the two beams 36, 38 which will dissipate all the kinetic energy of the moving body in a single excursion of the latch/contact mechanism from the initial point of contact to a maximum deflected position and back to the original position.

Figure 3:
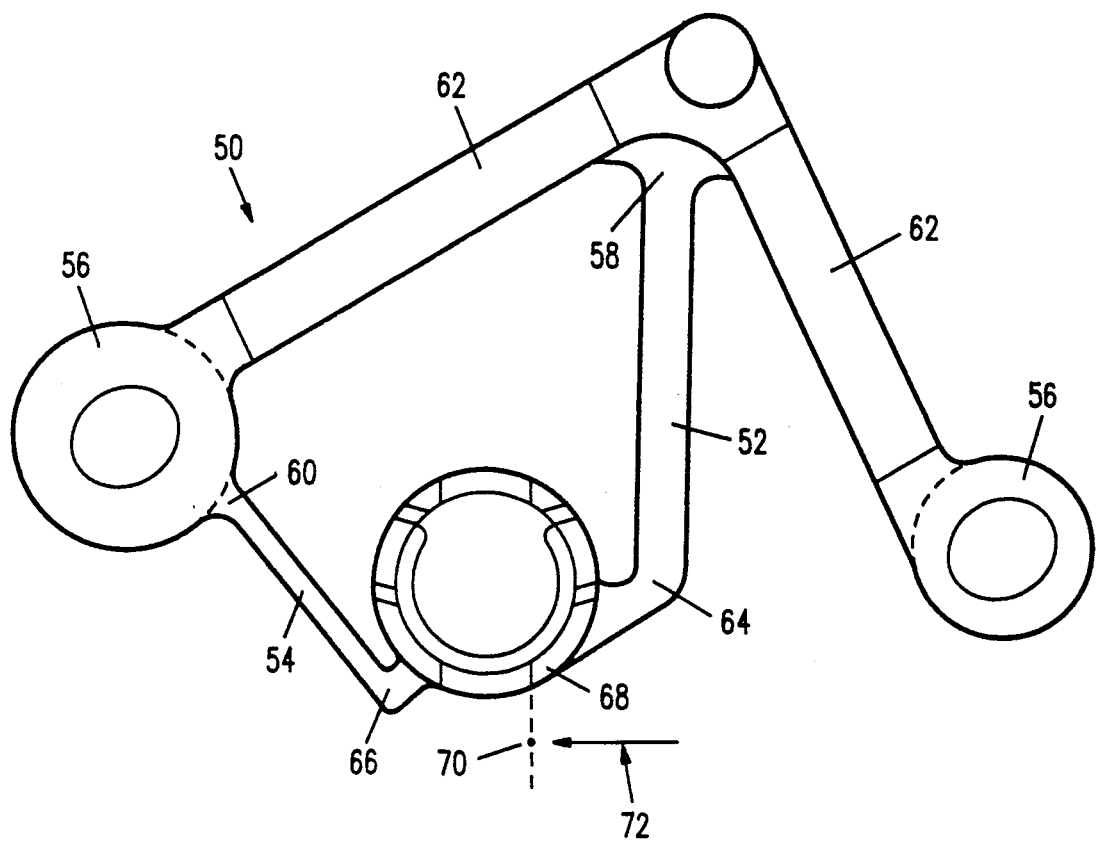
FIG. 3 is a plan view of a first embodiment of a latch housing made in accordance with the present invention.

FIG. 3 is a plan view of a latch housing 50 made in accordance with the present invention. In this embodiment of the invention, a cantilever beam 52 and a buckling beam 54 are both implemented in a single molded part which also incorporates mounting means 56 for attaching the latch housing 50 to the base member of the disc drive (4 and 2, respectively, in FIG. 1). Once the latch housing 50 is secured to the base member 4, the first ends 58, 60 of the cantilever beam 52 and the buckling beam 54 are fixed relative to each other by a pair of extremely rigid frame beams 62. The second ends 64, 66 of the cantilever beam 52 and the buckling beam 54 are connected to a latch receptacle 68 which is adapted to receive a latch mechanism (not shown) such as the one disclosed in the above-cited co-pending application. With such a latch incorporated, the point of contact between the moving carriage (not shown) and tho latch housing 50 occurs at the point designated 70 and the force of the carriage is exerted in the direction shown by arrow 72. In practice, the moving mass of the carriage and the velocity at which the carriage is moving when it contacts the latch are known factors which determine the specific design of the latch housing 50.

Tests have shown that a suitable material for the fabrication of the latch housing is Victrex® 450G PEEK, a product of ICI Advanced Materials, Exton, Pa. This material was selected based on its strength characteristics, as well as other factors such as wear resistance, stability over the specified operating temperature range of the disc drive, fire resistance and others. Other materials may be used without violating the spirit of the invention.

Once the moving mass and velocity of the carriage are known and a material has been selected, it is an exercise in proper engineering practices to design the cantilever beam 52 and buckling beam 54 which are the heart of the invention. In FIG. 3 it will be noted that the cantilever beam 52 is significantly more robust than the buckling beam 54, and in such a configuration, the majority of the kinetic energy of the moving carriage will be dissipated by the cantilever action of the cantilever beam 52, with the buckling beam 54 being a relatively supple member which acts primarily as a leash to limit the reactive motion induced in the system by the stresses induced in the materials of the cantilever beam 52 and buckling beam 54. By changing the configuration of the two beams 52, 54, the contribution of each beam to the shock absorption of the system can be widely controlled.

Figure 4:
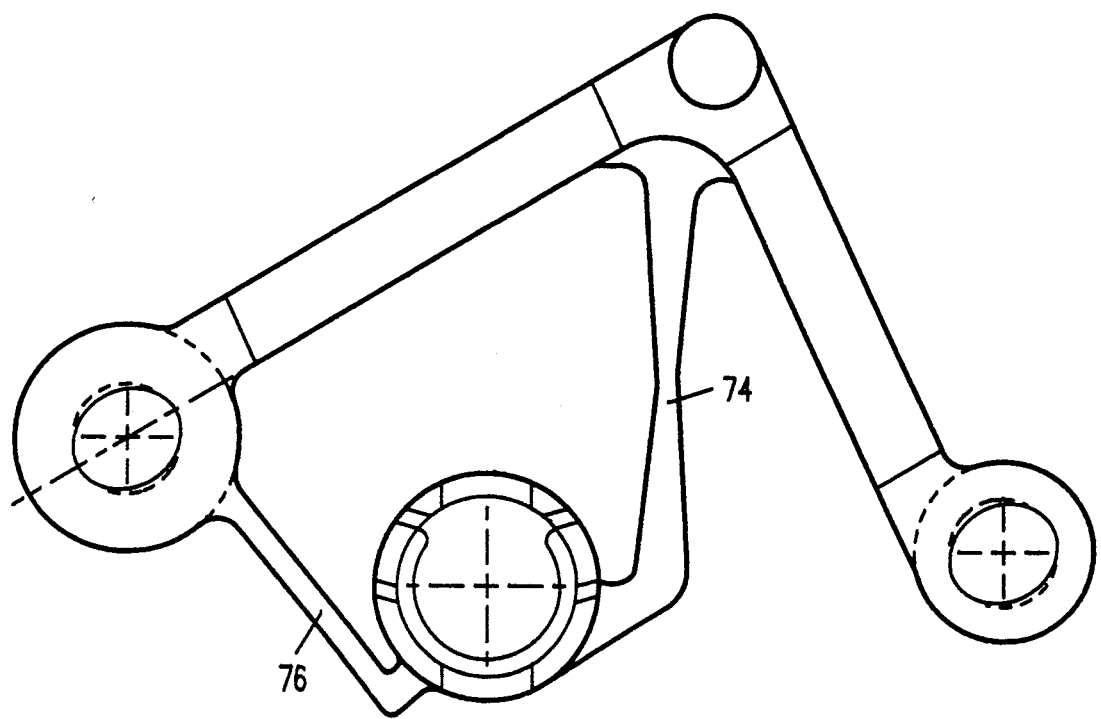
FIG. 4 is a plan view of a first variation of the latch housing of FIG. 3.

FIG. 4, for instance, shows a variation on the housing latch 50 of FIG. 3. In FIG. 4, the cantilever beam 74 can be seen to have been modified by changing the shape of the beam from a simple rectilinear bar to a shape in which the middle of the bar is narrowed, which will lower the force necessary to deflect the cantilever beam 74, while simultaneously lowering the reactive force which tends to straighten the cantilever beam 74. The buckling beam 76 has also been altered by increasing its cross-sectional area, which will stiffen the buckling beam 76 and make it more resistant to bending. It is easy to see that such changes will change the distribution of the forces exerted by the moving carriage.

Figure 5:
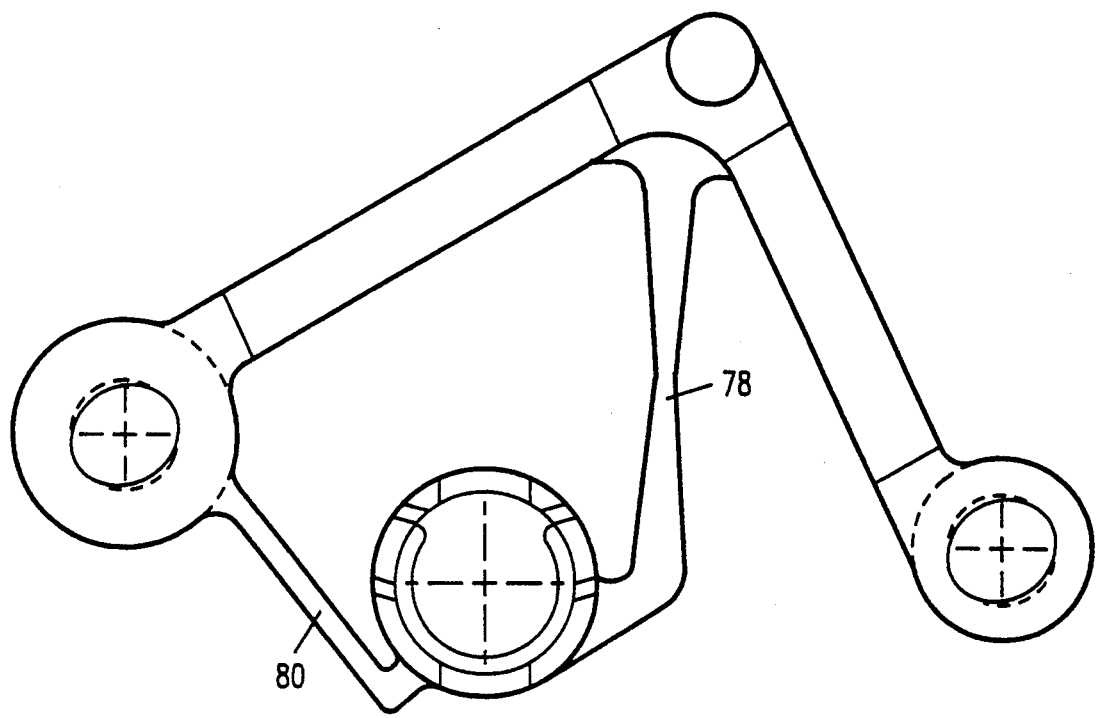
FIG. 5 is a plan view of a second variation of the latch housing of FIG. 3.

FIG. 5 shows another variation of the housing latch in which the cantilever beam 78 is similar to that of FIG. 4, while the buckling beam 80 has been reduced in cross-sectional area to resemble the buckling beam 54 of FIG. 3. With the cantilever beam 78 and the buckling beam 80 both thus "weakened", he overall energy distribution of the system is once again altered, producing a "softer" system overall, which would require that larger motion of the system in response to contact with the moving carriage be allowable.

From the above discussion, it is apparent that various modifications to the dimensions and shapes of the cantilever beam and buckling beam can be made to produce a latch housing which performs to widely diverse specifications, without a change of materials. If the material properties of various materials are taken into consideration, the combinations possible using the present invention are extremely varied.

It is evident that the present invention achieves the objects and meets the ends set forth above, as well as those inherent therein. Various modifications may occur to one skilled in the art. While a particular embodiment has been disclosed for purposes of explanation, the scope of the invention is intended to be limited only by the appended claims.

What is claimed is:

1. A disc drive data storage device including:
   actuator means;
   a first contact member integral to and movable with said actuator means, and;
   a one piece crash stop/latching member comprising
      a first resilient beam means having one end fixed and the other end positioned relative to a path of movement of said first contact member for substantially cantilevered deflection;
      a second resilient beam means having one end fixed and the other end positioned relative to said path of movement of said first contact member for substantially buckled deflection; and
      a second contact member mounted to the other ends of both said first resilient beam means and said second resilient beam means for cooperation with said first contact member;
   whereby the cantilever deflection and buckling deflection of the respective resilient beam means acts to stop the motion of said actuator means along said path while the second resilient beam means acts to limit the return motion of said second contact member when said second resilient beam means has reached its at rest, unbuckled position.

2. The disc drive data storage device of claim 1 wherein said first contact member is a first latching means and said second contact member is a second latching means for engagement with said first latching means.

3. The disc drive data storage apparatus of claim 2, wherein said second latching means comprises a permanent magnet.

* * * * *

UNITED STATES PATENT AND TRADEMARK OFFICE
CERTIFICATE OF CORRECTION

PATENT NO. : 5,313,354
DATED : May 17, 1994
INVENTOR(S) : Joseph M. Sampietro, Richard G. Krum and Khosrow Mahajerani It is certified that error appears in the above-indentified patent and that said Letters Patent is hereby corrected as shown below:

On title page, item [75] Inventors, delete "Mahajerani" insert --Mohajerani--.

Signed and Sealed this

Sixth Day of September, 1994

Attest:

BRUCE LEHMAN

*Attesting Officer*  *Commissioner of Patents and Trademarks*